(12) United States Patent
Shikama et al.

(10) Patent No.: US 10,921,688 B2
(45) Date of Patent: Feb. 16, 2021

(54) IMAGING OPTICAL APPARATUS

(71) Applicant: NIDEC COPAL CORPORATION, Tokyo (JP)

(72) Inventors: Kazuo Shikama, Tokyo (JP); Kenzo Imai, Tokyo (JP); Nobuaki Watanabe, Tokyo (JP); Shozo Iwato, Tokyo (JP); Koji Sawanobori, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 17 days.

(21) Appl. No.: 16/470,311

(22) PCT Filed: Nov. 24, 2017

(86) PCT No.: PCT/JP2017/042254
§ 371 (c)(1),
(2) Date: Jun. 17, 2019

(87) PCT Pub. No.: WO2018/110249
PCT Pub. Date: Jun. 21, 2018

(65) Prior Publication Data
US 2019/0331985 A1    Oct. 31, 2019

(30) Foreign Application Priority Data

Dec. 15, 2016    (JP) .................................. 2016-242834

(51) Int. Cl.
*G03B 17/14* (2006.01)
*H04N 5/225* (2006.01)
(Continued)

(52) U.S. Cl.
CPC .............. *G03B 17/14* (2013.01); *G03B 9/02* (2013.01); *G03B 13/36* (2013.01); *H04N 5/2254* (2013.01)

(58) Field of Classification Search
CPC .................................. G03B 9/02; G03B 9/08
See application file for complete search history.

(56) References Cited

U.S. PATENT DOCUMENTS

| | | | | |
|---|---|---|---|---|
| 6,817,788 B1 * | 11/2004 | Negishi | .................. | G03B 11/00 |
| | | | | 348/342 |
| 8,079,764 B2 * | 12/2011 | Ohno | ....................... | G03B 9/40 |
| | | | | 396/439 |

(Continued)

FOREIGN PATENT DOCUMENTS

| | | |
|---|---|---|
| JP | 11-142906 A | 5/1999 |
| JP | 2004-348030 A | 12/2004 |

(Continued)

OTHER PUBLICATIONS

International Search Report issued in corresponding International Patent Application No. PCT/JP2017/042254 dated Jan. 30, 2018.

*Primary Examiner* — Clayton E. LaBalle
*Assistant Examiner* — Leon W Rhodes, Jr.
(74) *Attorney, Agent, or Firm* — Troutman Pepper Hamilton Sanders LLP

(57) ABSTRACT

An imaging optical apparatus with a thin blade containing member for containing a blade member for limiting an opening, having an insertion portion that has an opening; an actuator for causing a blade member to slide; a containing frame for containing the actuator and the blade containing member, except for the insertion portion, having, on an outer edge, a recessed lens frame retaining portion into which the insertion portion; a lens frame, held in the lens frame retaining portion, having an insertion hole, for insertion of the insertion portion so that the center of the opening will be coaxial with the optical axis; and a clip for holding, in cooperation with the containing frame, a lens frame that is held in the lens frame retaining portion, through joining with the containing frame.

9 Claims, 5 Drawing Sheets

(51) Int. Cl.
*G03B 9/02* (2006.01)
*G03B 13/36* (2021.01)

(56) References Cited

U.S. PATENT DOCUMENTS 8,142,085 B2 * 3/2012 Hasegawa ................ G03B 9/02
396/463
8,545,114 B2 * 10/2013 Pavithran ............. H04N 5/2253
396/448

FOREIGN PATENT DOCUMENTS

| | | | |
|---|---|---|---|
| JP | 2007-271670 A | | 10/2007 |
| JP | 2007271670 A | * | 10/2007 |
| JP | 2016-166959 A | | 9/2016 |
| WO | 2017/030048 A1 | | 2/2017 |

* cited by examiner

IMAGING OPTICAL APPARATUS

CROSS-REFERENCE TO RELATED APPLICATIONS

This application is a National Stage of International Application PCT/JP2017/042254, filed Nov. 24, 2017 and published as WO 2018/110249 on Jun. 21, 2018, which claims priority to Japanese Application No. 2016-242834 filed Dec. 15, 2016. All applications above are herein incorporated by reference.

FIELD OF TECHNOLOGY

The present invention relates to a imaging optical apparatus used in an imaging device, or the like.

BACKGROUND

An imaging device is equipped with optical devices such as a lens device, a diaphragm device, and the like. The prior art that is taught in Japanese Unexamined Patent Application Publication 2004-348030, described below, is a lens device equipped integrally with a diaphragm mechanism, comprising a lens frame (lens barrel) and a diaphragm mechanism that is built into the lens frame. The diaphragm mechanism in this prior art comprises a plurality of diaphragm blades, an actuator for driving the diaphragm blades, and a case for containing the diaphragm blades and the actuator, where the case is formed in a long narrow shape that has a width that is narrower than the diameter of the lens frame and a length that is greater than the diameter of the lens frame, and is equipped with aa diaphragm blade containing part that is inserted into an insertion hole of the lens frame, and an actuator containing part that is disposed on the outside of the lens frame. Additionally, one side of the insertion hole of the lens barrel, into which the diaphragm blade containing part of the case is inserted, is blocked by an actuator containing part of the case, and the other side of the insertion hole is blocked by a cover that covers the tip end of the diaphragm blade containing part of the case.

SUMMARY

According to the prior art described above, the lens frame and the diaphragm mechanism can be integrated, but because the case of the diaphragm mechanism and the lens frame cannot be secured strongly, there have been failures wherein the lens frame and the case for the diaphragm blades have come apart, due to a dropping impact, or the like, and failures wherein the blade containing part of the case has moved within the lens frame to come into contact with the lens. Because the actuator for the diaphragm mechanism, and the like, is arranged at a side portion of the lens frame, there has been a problem in that it is difficult to equip, on the periphery of the lens frame, the actuator for moving the lens frame, such as for driving the focus.

The present invention is proposed in order to handle problems such as these. That is, the object is an imaging optical apparatus wherein the lens and the diaphragm, and the like, can be integrated securely, and wherein an actuator used for driving the focus, and the like, can be arranged easily on the periphery of the lens frame.

In order to solve such a problem, the lens driving device according to the present invention is provided with the following structures:

An imaging optical apparatus comprising: a thin blade containing member for containing a blade member for limiting an opening, having an insertion portion that has an opening; an actuator for causing a blade member to slide; a containing frame for containing the actuator and the blade containing member, except for the insertion portion, having, on an outer edge, a recessed lens frame retaining portion into which the insertion portion; a lens frame, held in the lens frame retaining portion, having an insertion hole, for insertion of the insertion portion so that the center of the opening will be coaxial with the optical axis; and a clip for holding, in cooperation with the containing frame, a lens frame that is held in the lens frame retaining portion, through joining with the containing frame.

BRIEF DESCRIPTIONS OF THE DRAWINGS

DETAILED DESCRIPTION

Embodiments according to the present invention will be explained below in reference to the drawings. In the descriptions below, identical reference symbols in the different drawings below indicate positions with identical functions, and redundant explanations in the various drawings are omitted as appropriate.

Figure 1:
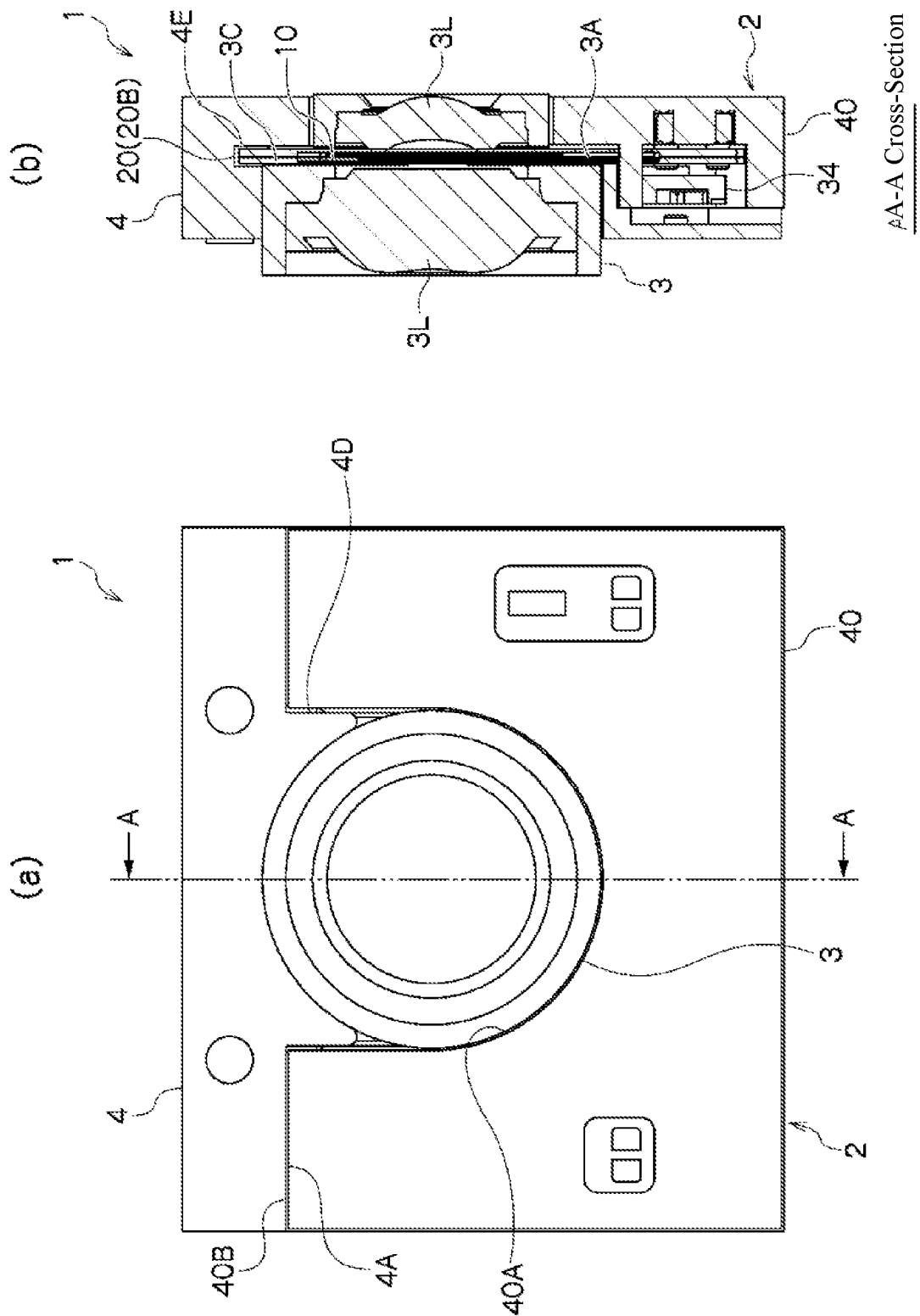
FIG. 1 is an explanatory diagram depicting an imaging optical apparatus according to an embodiment (a first embodiment) of the present invention (wherein (a) is an exterior plan view, and (b) is a cross-section along A-A).
Figure 2:
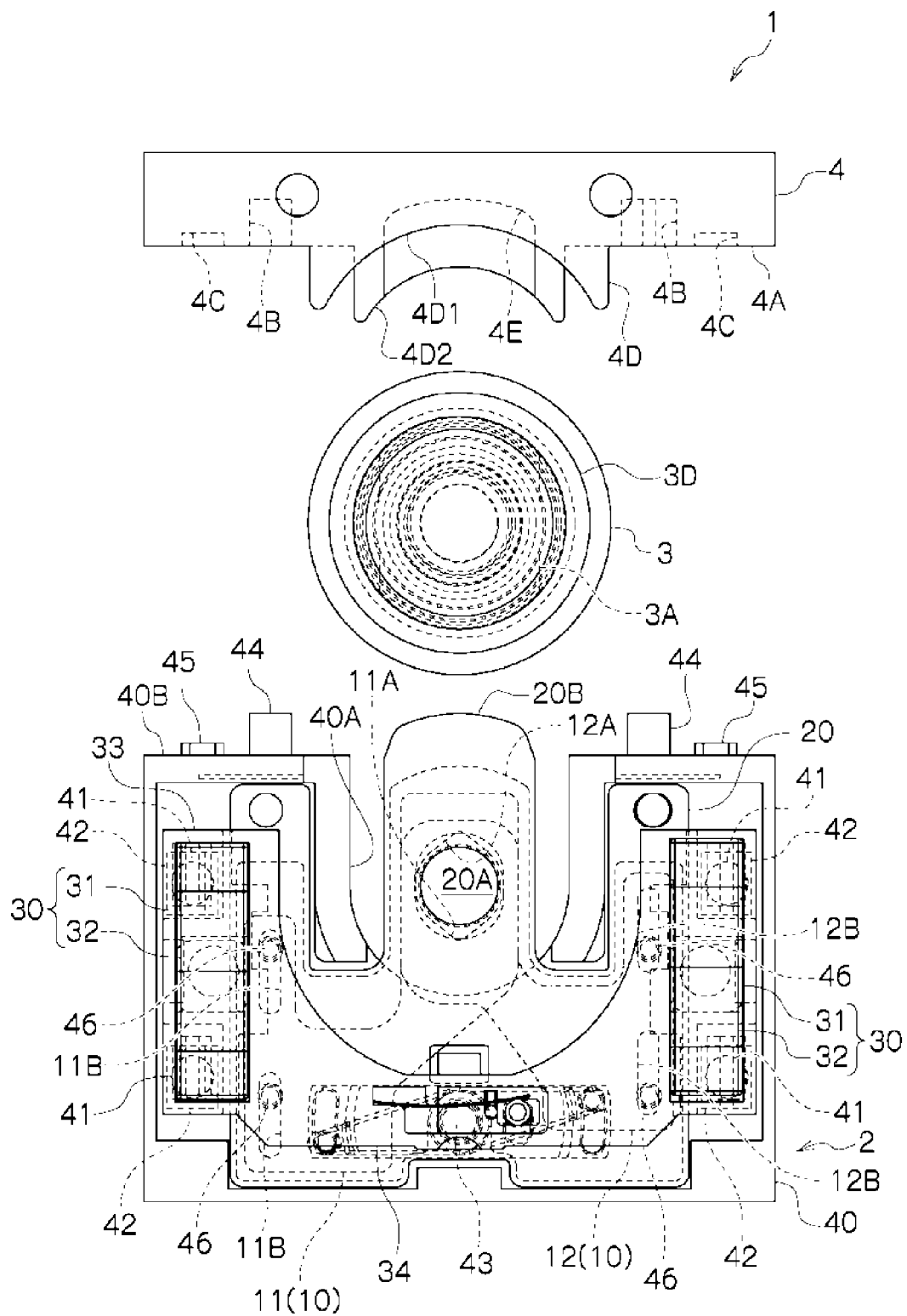
FIG. 2 is a plan view of the state wherein the containing frame, the lens frame, and the clip are separated.

As illustrated in FIG. 1 and FIG. 2, the imaging optical apparatus 1 according to an embodiment according to the present invention comprises a blade driving device 2, a lens frame 3, and a clip 4. The blade driving device 2 comprises blade members 10 (11, 12), blade containing members 20 (21, 22), an actuator 30, and a containing frame 40.

The blade containing member 20 is a thin plate-shaped member having an insertion portion 20B that has an opening 20A, and forms a blade chamber for containing the blade members 10 therein. The blade members 10 slide within the blade containing member 20, to limit the area of opening of the opening 20A. The blade members 10 (11, 12), as illustrated, are provided with openings 11A and 12A that overlap the opening 20A, and are provided with guide holes 11B and 12B that engage guide pins 46 that are provided in the containing frame 40.

The actuator 30 is a driving source for causing the blade members 10 to slide, and comprises a coil 31 and a magnet 32. The coil 31 or the magnet 32 is secured to the driving member 33 that slides within the containing frame 40, and the other is secured within the containing frame 40. The driving member 33 is connected to a lever member 34, the center thereof borne in the containing frame 40, where the lever member 34 is rotated by the driving member 33 being caused to slide within the interior of the containing frame 40 by the actuator 30, causing the blade members 10 (11 and 12) that are connected to the respective left and right ends of the lever member 34 to slide in mutually opposite directions. The position of the driving member 33 can be controlled to an arbitrary position through the output of a Hall element 48 that detects the magnet 32.

The containing frame 40 contains the actuator 30 and a blade containing member 20, except for an insertion portion 20B. Moreover, the containing frame 40 contains the driving member 33 and the lever member 34, referenced above. The driving member 33 is disposed within the containing frame 40, through a slide member 41, such as a bearing, or the like, and is provided with a slide groove 42 for supporting the slide member slidably within the containing frame 40. The driving member 33, through the magnet 32 that is held therein being attracted to magnetic material 47 that is attached to the containing frame 40, makes pressing contact with the slide member 41. The center portion of the lever member 34 is borne on a rotary shaft 43. Moreover, the outer edge of the containing frame 40 is provided with a recessed lens frame retaining portion 40A into which an insertion portion 20B of the blade containing member 20 protrudes.

The lens frame 3 comprises a lens 3L, in the interior thereof, and has an insertion hole 3A in a side face. An insertion portion 20B of the blade containing member 20 is inserted into the lens frame 3 that is held in the lens frame retaining portion 40A. An opening 20A in the insertion portion 20B that is inserted into the insertion hole 3A is arranged essentially coaxially with the optical axis of the lens frame 3. Moreover, the lens frame 3 is provided with a stepped portion 3C.

A clip 4 holds the lens frame 3 in cooperation with the containing frame 40. The lens frame 3, which is held in the lens frame retaining portion 40A of the containing frame 40, is held between the containing frame 40 and the clip 4. The containing frame 40 and the clip 4 are provided with mutually opposing joining faces on the outside of the lens frame retaining portion 40A. A joining protruding portion 44 and the positioning protruding portion 45 are provided on the joining face 40B of the containing frame 40, and a joining recessed portion 4B, for fitting with the joining protruding portion 44, and a positioning recessed portion 4C, for fitting with the positioning protruding portion 45, are provided on the joining face 4A of the clip 4.

The clip 4 comprises a protruding portion 4D that protrudes into the lens frame retaining portion 40A of the containing frame 40. The protruding portion 4D is provided with recessed portions 4D1 and 4D2, in compliance with the outer peripheral shape of the lens frame 3, so as to press the outer periphery of the lens frame 3 that is held in the lens frame retaining portion 40A, through insertion into the lens frame retaining portion 40A. In the example in the figure, the outer periphery of the lens frame 3 is equipped with a stepped portion 3C, and thus two stages of recessed portions 4D1 and 4D2 are provided so as to conform to this stepped portion.

Moreover, the clip 4 comprises a tip end containing portion 4E for containing therein the tip end of the insertion portion 20B that is inserted into the insertion hole 3A of the lens frame 3, and protrudes from the lens of frame 3. The tip end of the insertion portion 20B is protected, and deflection thereof is suppressed, through being contained within the tip end containing portion 4E.

In the imaging optical apparatus 1 that is structured in this way, an insertion portion 20B, having an opening 20A, is inserted into the lens frame 3, and a blade driving device 2 for driving the blade members 10 (11, 12) that limit the opening 20A can be arranged integrally with the lens frame 3, thus enabling the achievement of an imaging optical apparatus 1 that is compact and that can adjust the functional brightness.

Additionally, the imaging optical apparatus 1 is a structure wherein the lens frame 3 is held pressed between the containing frame 40 of the blade driving device 2 and the clip 4, thus enabling the lens frame 3 to be secured strongly, which can suppress failures due to the blade driving device 2 coming out of the lens frame 3 when there is a dropping impact.

Moreover, because the structure is one wherein the insertion hole 3A that is provided in the lens frame 3 is surrounded by the containing frame 40 and the clip 4, this can suppress stray light that enters into the lens frame 3 from the insertion hole 3A, and leakage light that leaks out from the lens frame 3, enabling prevention of ghost images or unintentional reductions in brightness.

Moreover, in the imaging optical apparatus 1, the tip end of the insertion portion 20B of the blade driving device 2, which is inserted into the lens frame 3, can be contained in the tip end containing portion 4E of the clip 4 that is combined with the containing frame 40 of the blade driving device 2, thus making it possible to protect the tip end of the insertion portion 20B, where the tip end, in a cantilevered state, would tend to be deflected easily, and can prevent the insertion portion 20B from coming into contact with the lens 3L, through suppressing deflection of the tip end of the insertion portion 20B.

Moreover, in the imaging optical apparatus 1, when the joining face 40B of the containing frame 40 of the blade driving device 2 and the joining face 4A of the clip 4 are joined together, the flat joining faces 40B and 40A can be secured together strongly, through adhesively bonding together, or the like, and secure and highly accurate joining is possible through fitting the joining protruding portion 44 and positioning protruding portion 45, that are provided on the joining face 40B, into the joining recessed portion 4B and the positioning recessed portion 4C that are provided in the joining face 4A.

Moreover, because the clip 4 is bonded to one side of the containing frame 40 of the blade driving device 2 in the imaging optical apparatus 1, through providing, on the clip 4, a mechanism for attracting or repelling the driving member 33 that slides within the containing frame 40 of the blade driving device 2, the position of the driving member 33 in the unpowered state can be held stably in the fully open position or the fully closed position. Specifically, through the provision, in the clip 4, of a magnetic member that magnetically attracts or magnetically repels the magnet 32 that is provided in the driving member 33, the position of the driving member 33 can be held stably in the fully open position or the fully closed position.

Figure 3:
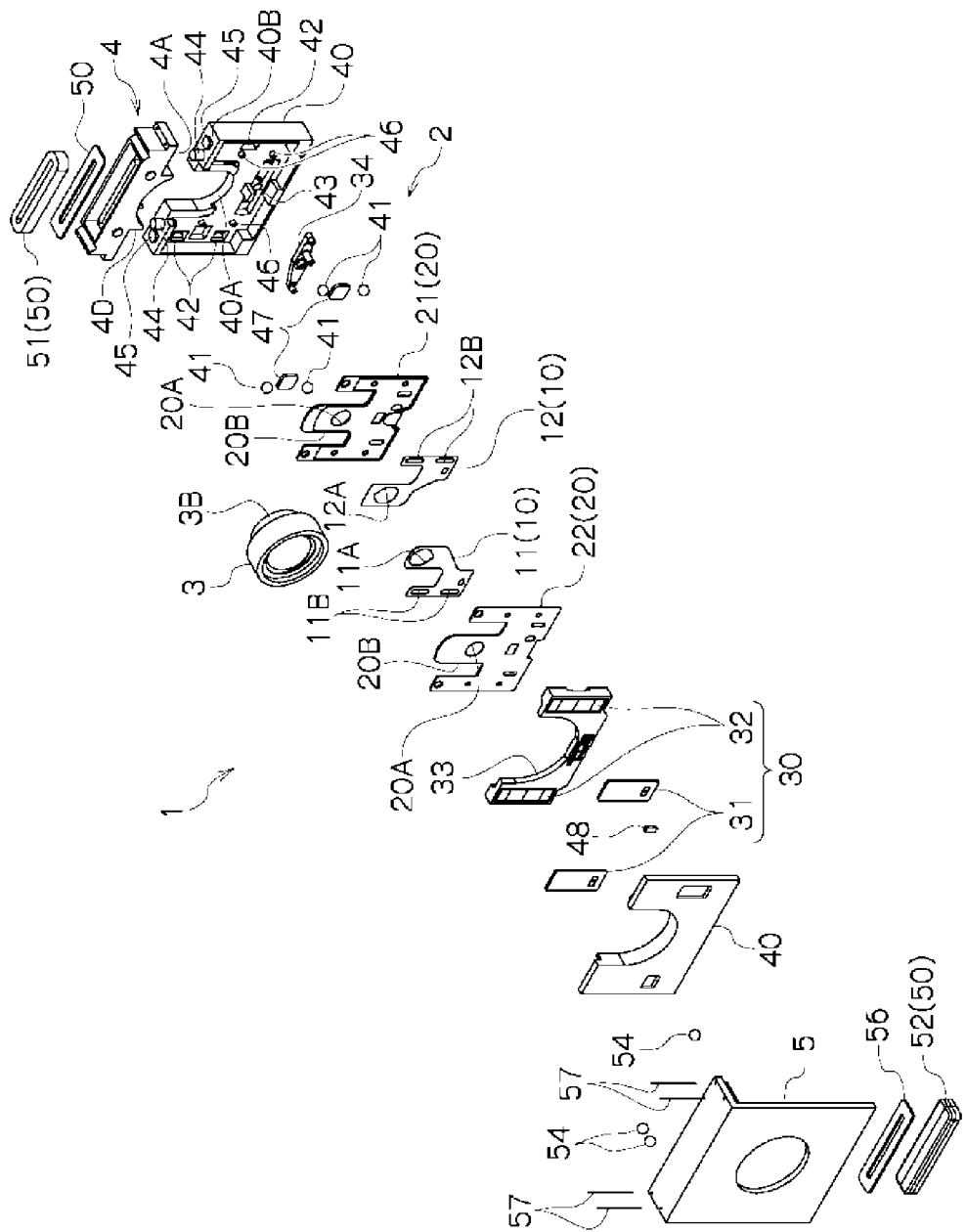
FIG. 3 is an exploded perspective diagram of an imaging optical apparatus according to an embodiment (second embodiment) according to the present invention.
Figure 4:
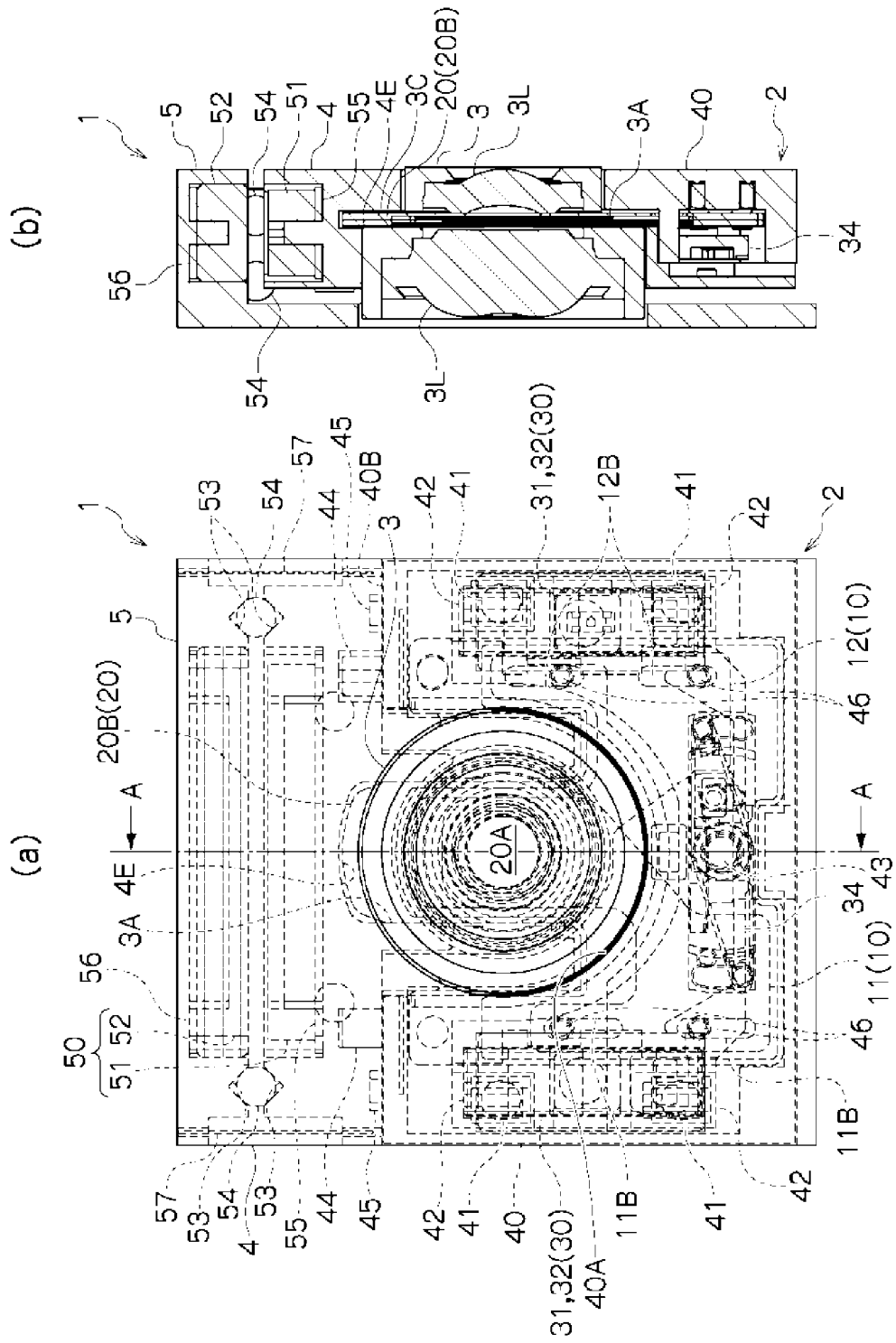
FIG. 4 is an explanatory diagram depicting the interior structure of an imaging optical apparatus according to an embodiment (a second embodiment) of the present invention (wherein (a) is a plan view, and (b) is a cross-section along A-A).
Figure 5:
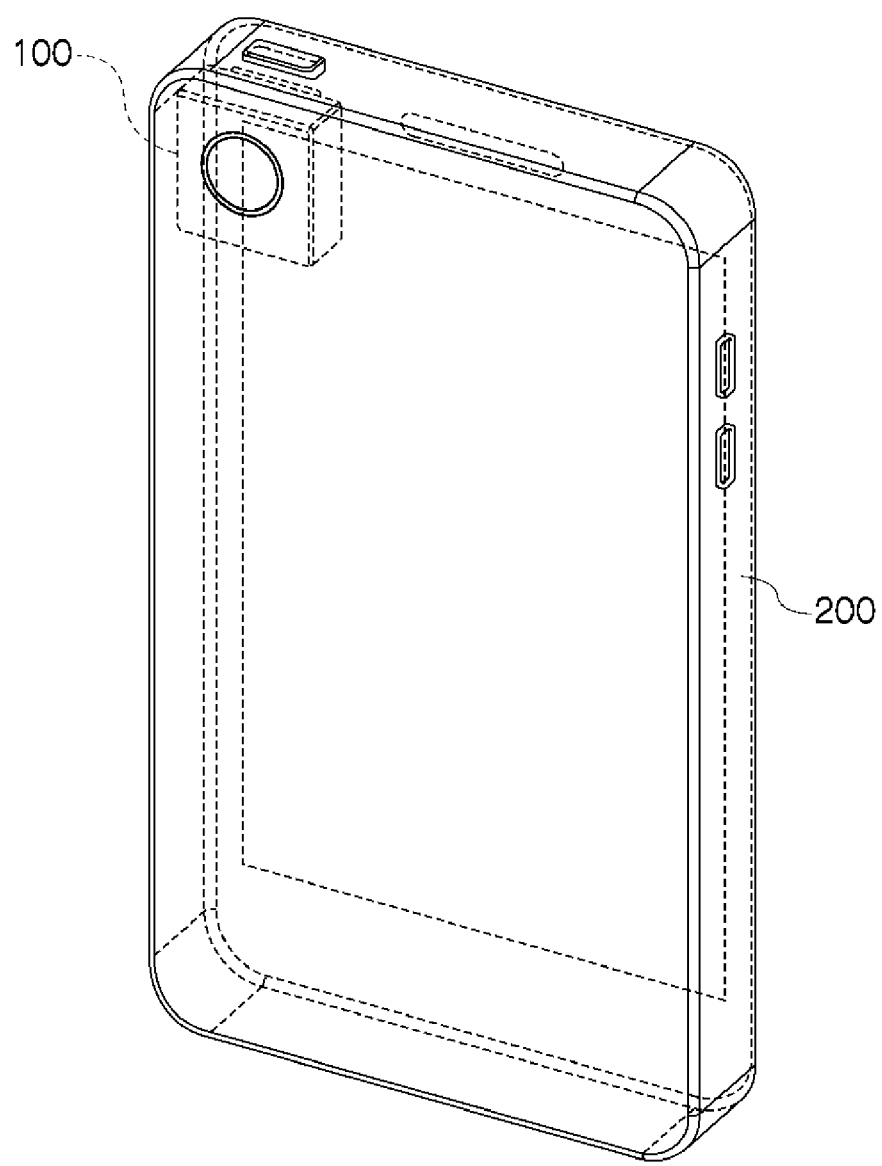
FIG. 5 is an explanatory diagram depicting a mobile electronic device comprising an imaging driving device (camera unit).

FIG. 3 and FIG. 4 show an imaging optical apparatus according to another embodiment according to the present invention. This imaging optical apparatus 1, as with the example described above, comprises a blade driving device 2, a lens frame 3, and a clip 4, where a driving member 51 of an actuator 50, for driving the lens frame 3 together with the blade driving device 2 in the optical axial direction, is equipped on the clip 4. In the example that is illustrated, the driving member 51 is a coil.

The imaging optical apparatus 1 depicted in FIG. 3 and FIG. 4 comprises a base member 5, where the blade driving device 2, the lens frame 3, and the clip 4 are equipped so as to be able to move in respect to the base member 5.

Because of this, a guiding portion 53 is provided in the clip 4 so as to cause the lens frame 3 to move along the optical axial direction. In the figure, the guiding portion 53 is a groove that extends in the optical axial direction of the lens frame 3, where a bearing 54 is supported slidably in this groove, and the clip 4 is supported movably on the base member 5 through the bearing 54. In the actuator 50, one of the driving members 51 (for example, the coil) is attached to the clip 4 side, and the other driving member 52 (for example, the magnet) is attached to the base member 5 side. Moreover, yokes 55 and 56 are disposed, facing the driving members 51 and 52, on the clip 4 and the base member 5.

In such an imaging optical apparatus 1, the provision of the driving member 51 on the clip 4 for holding the blade driving device 2 in the lens frame 3 enables the lens frame 3 to be moved in the optical axial direction in a state wherein the blade driving device 2 and the lens frame 3 are integrated into a single unit, enabling autofocus control to be carried out linked to the operation of the blade driving device 2. In the example in the figure, the clip 4 is supported elastically on the base member 5 through a wire 57, with the wire 57 as the path for the electric power, enabling power to be applied to the coil (the driving member 51) that is equipped in the clip 4. In this way, when the driving member 51 of the actuator 50 is provided in the clip 4, preferably magnetic material, for suppressing magnetic interference, is provided in the clip 4 so that there will be no magnetic interference between the actuator 50 and the actuator 30 that is within the containing frame 40 of the blade driving device 2.

Note that in another embodiment, camera shaking correction control may also be performed through the base member 5 being held so as to enable movement in the direction that is perpendicular to the optical axis. In this case, a bearing, or the like, may be used as a supporting member, and a voice coil motor (VCM), or the like, may be used as the driving member.

Moreover, as another embodiment, the configuration may be so as to not perform the autofocus control of the autofocus control and camera shaking correction control.

Moreover, as yet another embodiment, a filter may be provided in the opening 11A and/or 12A of the blade member 10. For example, adjustment to the amount of exposure through the use of an ND filter may be enabled through the provision of an ND filter in the opening 11A.

A camera unit (imaging device) can be structured through combining the imaging optical apparatus 1 of the various embodiments described above with an imaging element (CCD), not shown. This camera unit can be thinner and smaller, and can use less installation space in, for example, a mobile electronic device. Moreover, because this enables combination with the blade driving device 2 to be performed after adjusting the lens frame 3, and the like, this enables adjustments to be made easily and with high accuracy.

FIG. 6 depicts a mobile electronic device (mobile information terminal) 200 that is equipped with the camera 100. The mobile electronic device 200, such as a smart phone, or the like, has severe limitations on the thickness of the units packaged in the interior thereof, but the camera 100, as described above, enables a reduction in thickness through assembly with the blade driving device 2 contained within the thickness of the lens frame 3, thus enabling packaging with excellent spatial efficiency in a mobile electronic device 200 that targets high portability and design characteristics. Note that the members disposed within the frame 3 in these examples have the layout positions and shapes designed so as to be assembled sequentially from one side of the base frame 5.

While embodiments according to the present invention were described in detail above, referencing the drawings, the specific structures thereof are not limited to these embodiments, but rather design variations within a range that does not deviate from the spirit and intent of the present invention are also included in the present invention. Moreover, insofar as there are no particular contradictions or problems in purposes or structures, or the like, the technologies of the various embodiments described above may be used together in combination.

The invention claimed is:

1. An imaging optical apparatus comprising:
 a blade containing member, of a thin shape, containing a blade member to limit an opening, having an insertion portion that has an opening;
 an actuator causing a blade member to slide;
 a containing frame containing the actuator and the blade containing member, except for the insertion portion, having, on an outer edge, a recessed lens frame retaining portion into which the insertion portion is inserted;
 a lens frame, held in the lens frame retaining portion, having an insertion hole, for insertion of the insertion portion so that the center of the opening is coaxial with the optical axis; and
 a clip holding, in cooperation with the containing frame, the lens frame that is held in the lens frame retaining portion, through joining with the containing frame,
 wherein the clip comprises, in the interior thereof, a tip end of the insertion portion, which protrudes from the lens frame.

2. The imaging optical apparatus as set forth in claim 1, wherein:
 the containing frame and the clip are equipped with mutually opposing joining faces on the outside of the lens frame retaining portion; and
 the clip is equipped with a protruding portion that protrudes into the lens frame retaining portion.

3. The imaging optical apparatus as set forth in claim 1, further comprising:
 a driving member of the actuator, moving the lens frame in the optical axial direction, is equipped in the clip.

4. The imaging optical apparatus as set forth in claim 3, wherein:
 the driving member is a coil.

5. The imaging optical apparatus as set forth in claim 4, wherein:
 the clip is supported by a wire, and electric power is applied to the coil through the wire.

6. The imaging optical apparatus as set forth in claim 3, further comprising:
 a guiding portion moving along the optical axial direction is provided in the clip.

7. The imaging optical apparatus as set forth in claim 3, further comprising:
 a magnetic material suppressing magnetic interference with the actuator within the containing frame is provided in the clip.

8. An imaging device comprising the imaging optical apparatus as set forth in claim 1.

9. A mobile electronic device comprising an imaging device optical apparatus as set forth in claim 5.

* * * * *